(12) United States Patent
Sunder et al.

(10) Patent No.: US 9,056,987 B2
(45) Date of Patent: Jun. 16, 2015

(54) SUPER HYDROPHOBIC COATING

(71) Applicant: ILLINOIS TOOL WORKS, INC., Glenview, IL (US)

(72) Inventors: J. Mohan Sunder, Tamil Nadu (IN); Sameer Arvind Kapole, Maharashtra (IN); Subodh Deshpande, Andhra Pradesh (IN)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 0 days.

(21) Appl. No.: 13/843,673

(22) Filed: Mar. 15, 2013

(65) Prior Publication Data

US 2014/0208978 A1   Jul. 31, 2014

(30) Foreign Application Priority Data

Jan. 30, 2013   (IN) .............................. 412/CHE/2013

(51) Int. Cl.
| | |
|---|---|
| C08G 18/08 | (2006.01) |
| C09D 5/00 | (2006.01) |
| B82Y 40/00 | (2011.01) |
| C09D 7/12 | (2006.01) |
| C09D 175/04 | (2006.01) |
| B82Y 30/00 | (2011.01) |

(52) U.S. Cl.
CPC . *C09D 5/00* (2013.01); *B82Y 30/00* (2013.01); *B82Y 40/00* (2013.01); *C09D 7/1225* (2013.01); *C09D 7/1266* (2013.01); *C09D 7/1275* (2013.01); *C09D 175/04* (2013.01)

(58) Field of Classification Search
CPC .. B82Y 40/00; C09D 175/04; C03C 2217/76; C01B 33/18
USPC .................................................. 524/589, 847
See application file for complete search history.

(56) References Cited

U.S. PATENT DOCUMENTS

2008/0268233 A1 * 10/2008 Lawin et al. .................. 428/327
2010/0004373 A1     1/2010 Zhu et al.

FOREIGN PATENT DOCUMENTS

| WO | 2008106494 | 9/2008 |
|---|---|---|
| WO | 2012167017 | 12/2012 |
| WO | 2012170832 | 12/2012 |

* cited by examiner

*Primary Examiner* — Kuo-Liang Peng
(74) *Attorney, Agent, or Firm* — Blue Filament Law PLLC; Avery N. Goldstein

(57) ABSTRACT

A super hydrophobic coating composition that is a highly durable super hydrophobic transparent coating for glass, metal, and plastic, and automobile painted surfaces that is manually dispensable and may be easily applied to many substrates is provided. Moreover, the inventive super hydrophobic coating is user friendly as coating takes place at room temperature, and can be applied by a normal hand spray method. Embodiments of the coating dry within 30 minutes, and generate a super hydrophobic effect for ready use. The coating is useful to repel water droplets, dew drops, and dust particles in various applications such as solar panels, wind turbines surfaces, house hold components, metal coated furniture, marine equipment parts, marine sports equipment like speed boat screens, automobile wind shields, automobile plastic components, auto bodies and aerospace applications.

24 Claims, 4 Drawing Sheets

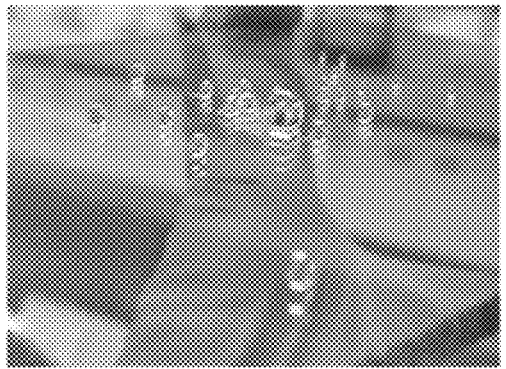
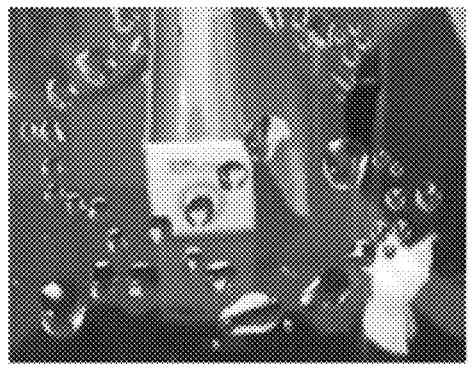
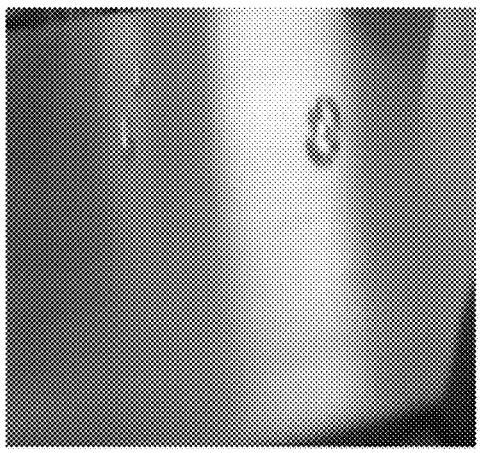
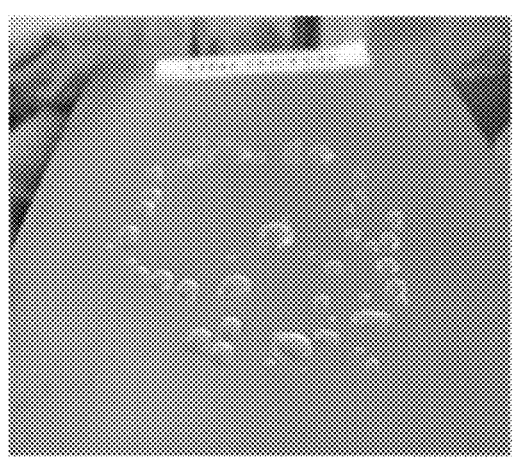
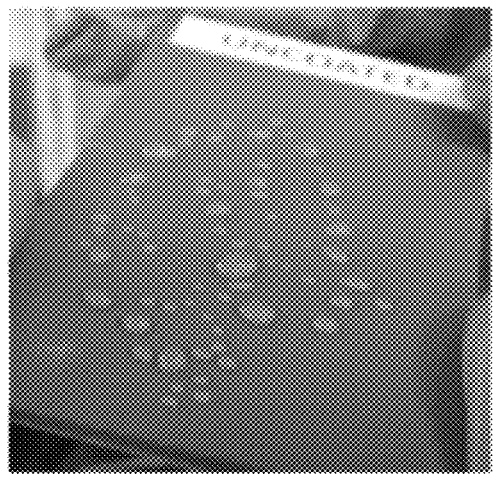
FIG. 3A                              FIG. 3B

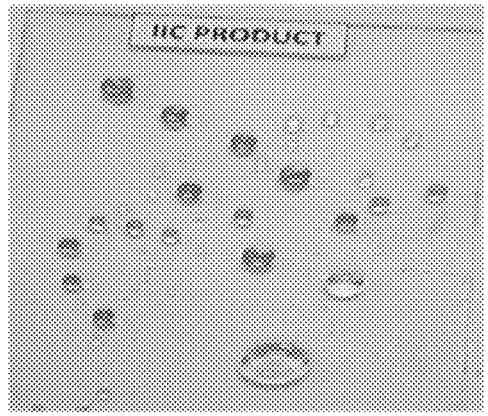 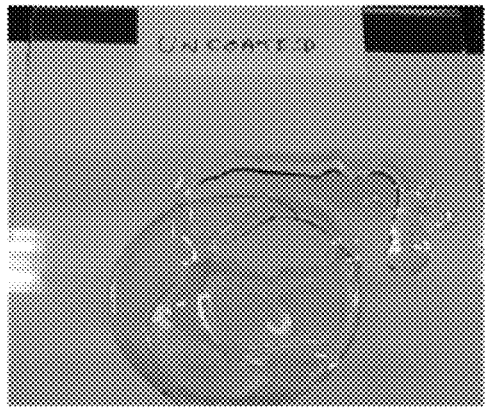
FIG. 4A　　　　　　　　FIG. 4B
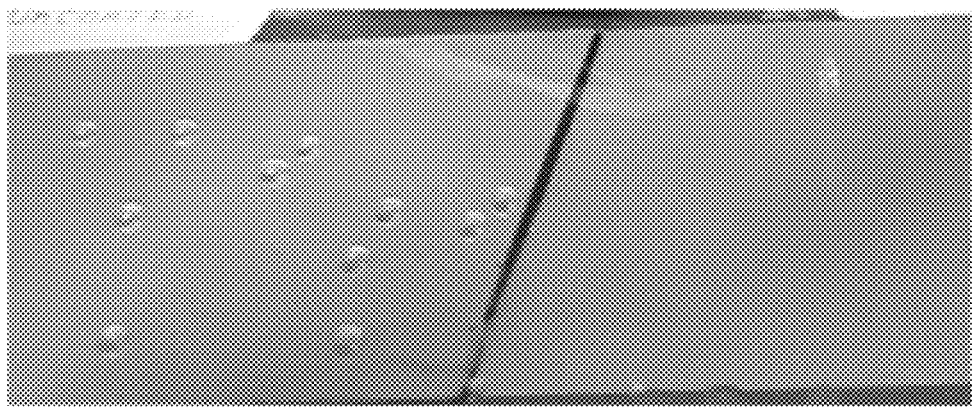
FIG. 5

SUPER HYDROPHOBIC COATING

CROSS-REFERENCE TO RELATED APPLICATIONS

This application is a non-provisional application that claims priority benefit of Indian Provisional Application Serial No 412/CHE/2013, filed Jan. 30, 2013 the contents of which are hereby incorporated by reference.

FIELD OF THE INVENTION

The present invention relates to a reactive and highly durable super hydrophobic coating, with built in lotus leaf effect, for application on substrates including metal, plastic, and glass for various applications where water is required to be repelled. Processes for the production of such coatings and methods to make the surfaces hydrophobic using the coating are also disclosed.

BACKGROUND OF THE INVENTION

In industries like automotive, aerospace, and marine appliances, surface coatings play a vital role in not only protecting components in terms of anticorrosion, but also in enhancing aesthetic appeal. Deterioration of plastic, metal, and glass surfaces is of primary main concern in these applications. Various external factors like solid (dust particles, burnt hydrocarbon, etc.) and liquid (moisture, chemicals, muddy water, etc.) are affecting the substrates in day to day life. This problem is more severe for metals, typically when water droplets dry on the surface, water mark, or spots are left behind due to the deposit of minerals, which when are further in contact with water and oxygen can lead to corrosion cell formation. In a similar fashion plastic and glass surfaces also facing the problem of stains or water marks after evaporating the water, which further affects the aesthetic of the coated plastic components and see-through vision of wind shield glasses. However this solid, liquid, or gaseous adsorption, or wettability phenomenon is unavoidable for any surface, and requires extra physical work and time to clean those substrates. An understanding of the wettability of various materials is required, based on the physical and chemical heterogeneity of the materials.

There are many products on the market that are used to repel water from surfaces, where the expulsion of water is desired. However these available water repellent coatings have certain disadvantages as discussed in the foregoing session.

U.S. Patent Publication 2011/0206925 (Kissel et al.) teaches a polymer aero-gel based super hydrophobic coating which can be achieved with a three step procedure. As per this invention annealing as a surface treatment by heating at 150° C. for 3 hours is required to cure the coating on the substrate, and a contact angle may be achieved only up to 140°.

U.S. Patent Publication 2011/0177252 (Kanagasbapathy et al.) discloses a method of preparation of super hydrophobic coating, which comprises hydrophobic nano-particles of silsesquioxanes containing adhesion promoter group and a low surface energy group. The coating is applied on already painted/wax applied metal/wood/glass/ceramic surface. In the method disclosed, the reaction is not with a substrate, and was found inferior with regard to long term durability.

U.S. Patent Publication 2011/0159299 (Linforf et. al.) discloses a hydrophobic coating application wherein the application steps include surface treatment with plasma. Linforf et al. further discloses a water contact angle up to 120°. However, the disclosed hydrophobic layer of the composition requires the plasma surface treatment.

U.S. Patent Publication 2009/0064894 (Baumaret et al.) teaches a water based hydrophobic self-cleaning coating composition which is opaque in nature. However, the coating composition of this invention is not durable.

U.S. Patent Publication 2007/0141306 (Kasai et al.) discloses a process for preparing a super hydrophobic coating wherein the sliding angle/rolling angle of 25° or less for a deposited 0.02 mL water droplet, after immersion in water for a period of 1 hour is disclosed. The drawback of this disclosed coating is the peel off effect after immersion in water for a period of 1 hour.

Therefore, there is a need for an improved hydrophobic coating that alleviates all the problems of the prior art as mentioned above.

SUMMARY OF THE INVENTION

Embodiments of the present invention provide a super hydrophobic coating composition that is a highly durable super hydrophobic transparent coating for glass, metal, and plastic, and automobile painted surfaces that is manually dispensable and may be easily applied to many substrates. Moreover, the inventive super hydrophobic coating is user friendly as coating takes place at room temperature, and can be applied by a normal hand spray method. Embodiments of the coating dry within 30 minutes, and generate a super hydrophobic effect for ready use. The coating is useful to repel water droplets, dew drops, and dust particles in various applications such as solar panels, wind turbines surfaces, house hold components, metal coated furniture, marine equipment parts, marine sports equipment like speed boat screens, automobile wind shields, automobile plastic components, auto bodies and aerospace applications.

Embodiments of the present invention provide a super hydrophobic coating composition including a hydrophobic agent, a binder, or an etching chemical. The super hydrophobic coating composition may further include a solvent. In certain other embodiments, the super hydrophobic coating composition may further include a solvent, and a surface additive.

In an embodiment, the super hydrophobic coating composition may include an organically modified nanoparticles of silica or titanium as the hydrophobic agent, and a polyurethane as a binder that is formed of a polyol as base and as an isocyanate as hardner. The super hydrophobic coating composition may further include a solvent which may include xylene, butyl acetate, toluene, or etheyl acetate. The composition may further include a surface additive which may be a silicone modified polyacrlylate.

In an embodiment, the super hydrophobic coating composition may include the hydrophobic agent in an amount of 0.1 to 10 parts by weight, and the binder in an amount of 0.1 to 10 parts by weight, solvent in an amount of 75 to 94 parts by weight, and a surface additive in an amount of 0.1 to 8 parts by weight.

In an embodiment, the super hydrophobic coating composition may include a silane as the hydrophobic agent, and sulphuric acid, phosphoric acid, chlorosilane, etc. as the etching chemical.

In an embodiment, the super hydrophobic coating composition may include the hydrophobic agent in an amount of 0.05 to 20 part by weight, the etching chemical in an amount of 0.05 to 10 parts by weight and the solvent in an amount of 70 to 99.8 parts by weight.

Embodiments of the present invention also provide a process for preparing a super hydrophobic coating composition including the steps of preparing a base resin solution by disssolving the polyol resin in 80% of the solvent, adding a surface additive to the resin solution, adding hydrophobic nano particles in the remaining 20% of solvent, and adding a hardner to the above solution in a base to hardner ratio of 1:1.

In a further process for preparing a super hydrophobic coating composition, the process includes the steps of adding an etching chemical to a solvent, and adding a hydrophobic agent like silane to the above mixture.

Among the advantages offered by embodiments of the inventive composition include:

very high super hydrophobicity—high contact angle and low sliding angle; durability in terms of contact angle, and a water rolling effect, which is excellent even after continuous exposure to running water for 5 hours and after subjecting the coating to the wet abrasion test; the coating does not require any extra surface treatment before the application of coating and can be applied at room temperature; no force drying is required after the application as compared to other products; and coatings of about 99% transparency.

BRIEF DESCRIPTION OF THE DRAWINGS

The foregoing summary, as well as the following detailed description of the invention will be better understood when read in conjunction with the appended drawings. For the purpose of assisting in the explanation of the invention, there are shown in the drawings embodiments which are presently preferred and considered illustrative. It should be understood, however, that the invention is not limited to the precise arrangements and instrumentalities shown therein. In the drawings:

FIG. 3A is a series of photographic views of the super hydrophobic effect of the coating compositions of the present invention over various surfaces including I) Glass II) aluminium and III) ABS plastic for a surface coated with the inventive coating;

FIG. 3B is a series of photographic views of the super hydrophobic effect of the coating compositions of the present invention over various surfaces including I) Glass II) aluminium and III) ABS plastic for an uncoated surface;

FIG. 4A is a photographic view of the honey effect on a coated glass panel;

FIG. 4B is a photographic view of the honey effect on a uncoated glass panel; and FIG. 5 is a photographic view of an automobile body panel with split between a coated and non-coated side.

DESCRIPTION OF THE INVENTION

Figure 1:
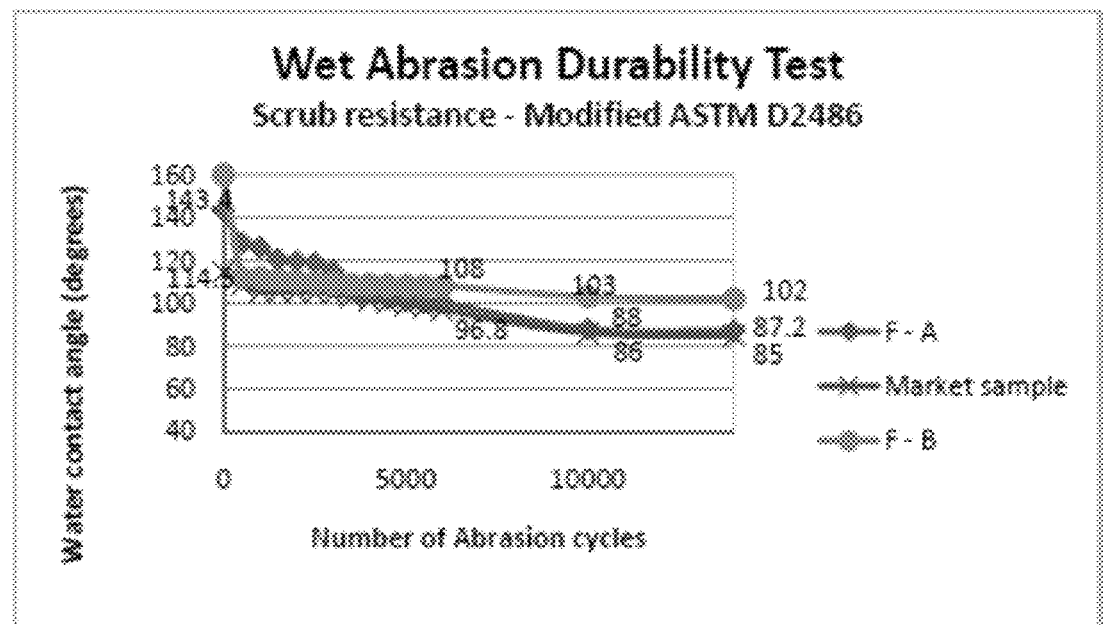
FIG. 1 is a graphical representation of the wet abrasion durability test result.

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification are to be understood as being modified in all instances by the term "about". It is noted that, unless otherwise stated, all percentages given in this specification, and appended claims refer to percentages by weight of the total composition.

Thus, before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

It must be noted. that as used in this specification and the appended claims, the singular forms "a," "an" and "the" include plural referents unless the content clearly dictates otherwise. Thus, for example, reference to a "silane" may include two or more such silanes. Unless defined otherwise, all technical and scientific terms used herein have the same meaning as commonly understood by one of ordinary skill in the art to which the invention pertains.

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification are to be understood as being modified in all instances by the term "about". It is noted that, unless otherwise stated, all percentages given in this specification and appended claims refer to percentages by weight of the total composition.

Thus, before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

DEFINITIONS

The term "superhydrophobic" as used herein refers to the property of being or making a extremely hydrophobic i.e., extremely difficult to wet. The notion of using the contact angle made by a droplet of liquid on a surface of a solid substrate as a quantitative measure of the wetting ability of the particular solid has also long been well understood. Wetting is the ability of a liquid to maintain contact with a solid surface, resulting from intermolecular interactions when the two are brought together. The degree of wetting (wettability) is determined by a force balance between adhesive and cohesive forces. If the contact angle is greater than 90° for the water droplet to the substrate surface then it is usually considered to be hydrophobic. For example, there are materials on which liquid droplets have high contact angles, such as water on paraffin, for which there is a contact angle of about 107°. Many applications require a hydrophobic coating with a high contact angle of at least 150°, and preferably at least 165°. Such coatings are referred to as super-hydrophobic coatings.

As used herein, the term "contact angle" or "static contact angle" is referred to as the angle between a static drop of deionized water and a flat and horizontal surface upon which the droplet is placed. The contact is conventionally measured through the liquid, where a liquid/vapor interface meets a solid surface, and quantifies the wettability of a solid surface by a liquid. The higher the contact angle, the higher the hydrophobic interaction between the surface and the liquid. Sliding angle or roll-off angle is defined as the angle between the sample surface and the horizontal plane at which the liquid drop starts to slide off the sample surface under the influence of gravitational force. If a liquid spreads completely on the surface and forms a film, the contact angle is zero degrees (0°). As the contact angle increases, the wetting resistance increases, up to a theoretical maximum of 180°, where the liquid forms spherical drops on the surface. The term "wet-proof" is used to describe surfaces having a high wetting resistance to a particular reference liquid; "hydrophobic" is a term used to describe a wetting resistant surface where the reference liquid is water. The higher the contact angle, the higher the hydrophobic interaction between the surface and the liquid.

As used herein, the term "wetproof" and "hydrophobic" refers to a surface that generates a contact angle of greater than 90° with a reference liquid. As the wetting behavior depends in part upon the surface tension of the reference liquid, a given surface may have a different wetting resistance (and hence form a different contact angle) for different liquids.

As used herein, the term "substrate" is not construed to be limited to any shape or size, as it may be a layer of material, multiple layers or a block having at least one surface of which the wetting resistance is to be modified.

As used herein the term "hydrophobic" is characterized by the contact angle for water of greater than 90°, which means that the water droplet does not wet the surface.

As used herein, "super-hydrophobicity" refers to a contact angle for deionized water at room temperature equal to or greater than 150° and "self-cleaning" refers to a sliding angle less than 5°.

The rolling of liquid droplets and the removal of foreign particles depend on both the hydrophobicity of the surface and the surface roughness caused by different microstructures. The lotus plant exhibits self cleaning properties because the surface of the leaves is covered with small nano sized projections, bumps or ridges. Such surfaces exhibit super hydrophobic characteristics due to nano sized irregularities which results in the contact angle of a water droplet to exceed 150° and the roll-off or sliding angle to less than 10°. This is thereof are often referred to as exhibiting the "lotus leaf effect".

As used herein the term "lotus effect" is a naturally occurring effect first observed on lotus leaves and is characterized by having a randomly rough surface and low contact angle hysteresis, which means that the water droplet is not able to wet the microstructure spaces between the spikes. This allows air to remain inside the texture, causing a heterogeneous surface composed of both air and solid. As a result, the adhesive force between the water and the solid surface is extremely low, allowing the water to roll off easily and to provide the "self-cleaning" phenomena.

The lotus plant exhibits self-cleaning properties because the surfaces of the leaves are covered with small nano sized projections, bumps or ridges. Surfaces exhibiting super hydrophobic characteristics due to nano sized irregularities thereof are often referred to as exhibiting the "Lotus Effect". Super hydrophobic coatings utilizing nano sized irregularities applied to a surface form a high contact angle which resist wetting and adherence of dirt and contaminants.

The Lotus Effect is a well-known technology capable of producing super hydrophobic surfaces. Interestingly, those surfaces are comprised of nanoparticles that are not inherently hydrophobic. The hydrophobic properties are the result of the nanoscale. Importantly, the nanoparticles make possible the production of a super-hydrophobic surface. Equally important, the nanoparticles provide a nano-textured surface that dramatically reduces the surface area available for dust to contact.

As used herein, the term "coating" means a deposit layer applied to part or all of an exposed surface of a substrate.

As used herein, the term "Adsorption principle" is based on the fact that coating film gets cured due to evaporation of solvent, and nanoparticles gets adsorbed firmly on the surface of the substrate to perform as per the desired set properties of generating higher contact angle and water repellency.

Embodiments of the present invention provide a super hydrophobic coating composition that is a highly durable super hydrophobic transparent coating for glass, metal, and plastic, and automobile painted surfaces that is manually dispensable and may be easily applied to many substrates. Moreover, the inventive super hydrophobic coating is user friendly as coating takes place at room temperature, and can be applied by a normal hand spray method. Embodiments of the coating dry within 30 minutes, and generate a super hydrophobic effect for ready use. The coating is useful to repel water droplets, dew drops, and dust particles in various applications such as solar panels, wind turbines surfaces, house hold components, metal coated furniture, marine equipment parts, marine sports equipment like speed boat screens, automobile wind shields, automobile plastic components, auto bodies and aerospace applications.

Embodiments of the present invention provide a super hydrophobic coating composition including a hydrophobic agent, a binder, or an etching chemical. The super hydrophobic coating composition may further include a solvent. In certain other embodiments, the super hydrophobic coating composition may further include a solvent, and a surface additive.

In an embodiment, the super hydrophobic coating composition may include an organically modified nanoparticles of silica or titanium as the hydrophobic agent, and a polyurethane as a binder that is formed of a polyol as base and as an isocyanate as hardner. The super hydrophobic coating composition may further include a solvent which may include xylene, butyl acetate, toluene, or etheyl acetate. The composition may further include a surface additive which may be a silicone modified polyacrlylate.

The coating composition as per the present invention repels water like lotus leaves and provides contact angle of about 160° and sliding angle of about 2°. The superhydrophobic coating according to this invention may be prepared based on adsorption chemistry route or on reactive chemistry.

Accordingly in one embodiment of the present invention, the coating composition is based on adsorption chemistry, and the coating composition includes a binder and a hydrophobic agent as a filler.

In an embodiment, the binder includes polyurethane, epoxy, phenolic, acrylic, polyester, or silicone resin, etc. Typically, the binder is added in an amount of 0.1 to 10 parts by weight, in other embodiments in an amount of from about 0.5 to 7 parts by weight and in other embodiments in an amount of about 0.1 to 5 parts by weight.

In an embodiment, the binder may be polyurethane. The binder may be a two pack system including a polyester polyol resin as a base and prepolymeric isocyanate as hardener. One component of the binder includes a composite of polyester polyol base resin, and hydrophobic nanoparticles, and another component includes a hardener resin.

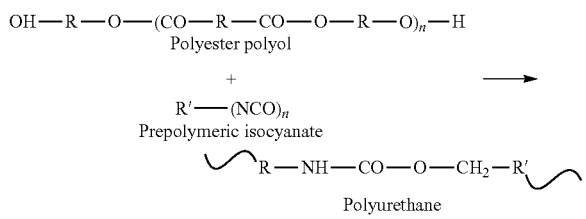

Polyurethane (PU) as used herein may be defined as polymer composed of a chain of organic units joined by carbamate (urethane) links. Polyurethane polymers are formed by reacting an isocyanate with a polyol. Both the isocyanates and polyols used to make polyurethanes contain an average two or more functional groups per molecule.

Polyols as used herein may be defined as compounds with multiple hydroxyl functional groups available for organic reactions. A molecule with two hydroxyl groups is a diol, one with three is a triol, one with four is a tetrol and so on. Monomeric polyols such as glycerin, pentaerythritol, ethylene glycol and sucrose often serve as the starting point for polymeric polyols. Polymeric polyols are generally used to produce other polymers. Polymeric polyols are reacted with isocyanates to make polyurethanes. Polymeric polyols are usually polyethers or polyesters. Common polyether diols are polyethylene glycol, polypropylene glycol, and poly(tetramethylene ether)glycol. Polyether polyols account for about 90% of the polymeric polyols used industrially; the balance is polyester polyols. Reactive polyols as per the invention have hydroxyl functionality which on reacting with a stoichiometric excess of a polyisocyanate provides NCO terminated polyurethane prepolymer. Suitable polyols operative herein illustratively include polyester polyols having molecular weight from 850 to 3000, and combinations. The polyol is typically present in the pre-polymer composition in an amount from about 0.1 to 5 parts by weight, in other embodiments from about 0.5 to 3.5 parts by weight and even more preferably from about 0.1 to 2.5 parts by weight.

Isocyanates used herein may be diisocyanates or polyisocyanates having two or more than two highly reactive isocyanate —N=C=O) moieties per molecule. Polyisocyanate include any suitable isocyanate having at least two isocyanate groups illustratively include aliphatic-, aromatic-, cycloaliphatic-, arylaliphatic-arylalkyl-, alkylaryl-isocyanates, (TDI) Toluene diisocyanate, (HDI) Hexamethylene diisocyanate, and mixtures thereof. Suitable isocyanate functional monomers operative herein illustratively include HDI etc., and mixtures thereof. The isocyanate monomer is typically present in the prepolymer composition in an amount from about 0.1 to 5 parts by weight, in other embodiments from about 0.5 to 3.5 parts by weight, and even more preferably from about 0.1 to 2.5 parts by weight.

Polyurethane chemistry as shown above is based on the reactions of isocyanate groups with active hydrogen-containing compounds. The —NCO moiety will readily react with hydrogen atoms that are attached to atoms that are more electronegative than carbon. This polymerization reaction will form the three-dimensional network of polyurethane structure. The preferred ratio of base polyol resin and hardener is about 1:1.

In an embodiment the hydrophobic agent includes organically modified nano particles of silica or titanium. In certain embodiments, a the hydrophobic agent is present in an amount of 0.1 to 10 parts by weight, preferably in an amount of 0.1 to 7 parts by weight, and more preferably in an amount of 0.5 to 4 parts by weight.

In an embodiment organically modified silica nano particles (OMSP) are used as a hydrophobic agent, which plays the key role in achieving super hydrophobicity. These nano particles are preferably surface treated by using polydimethylsiloxy group. The nano particles imparts super hydrophobicity to the formulation. The hydrophobic nano particles are dispersed in the polyester polyol resin under sonication. Particle size of the pigment particles preferably range from about 20 nm to 500 nm, and more preferably from 10 nm to 500 nm. The paste of polyesterpolyol resin and OMSP is further mixed with pre-polymeric isocyanate hardener, as per the stoichiometric proportion. This polyester polyol resin consists of OH group, and the polyurethane hardener consists of NCO group in the chain which chemically reacts with each other to form a polymer network. OH groups enhance the anchoring tendency and bond strength with a substrate.

In certain embodiments, the super hydrophobic coating composition may further include a surface additive which may be a hydroxy-functional silicone modified poly acrylate. This may orientate into the coating surface and cross linked in to the polymer network due to their OH—functionality, which improves dirt release and ease of cleaning. Typically, the surface additive is added in an amount of 0.1 to 8 parts by weight, in other embodiments in an amount of from about 0.5 to 5 parts by weight, and in other embodiments in an amount of about 0.1 to 3 parts by weight.

The coating composition may further include a solvent. The solvent may be preferably selected from xylene, butyl acetate toluene or ethyl acetate. Solvents help a coating system to get transferred from the spray gun to surface of the substrate, and improve rheological and leveling properties. Typically, the solvent is added in an amount of 75 to 94 parts by weight, in other embodiments in an amount of from about 80 to 90 parts by weight and in other embodiments in an amount of about 85 to 94 parts by weight.

The above mentioned coating composition provides an increase of hydrophobicity, improve substrate wetting, leveling, surface slip, water resistance (blush resistance), anti-blocking properties, and weather resistance. The additives may also be used to improve anti-graffiti properties.

An embodiment of hydrophobic coating composition is given below:

Formulation A includes a Binder in 0.1 to 10 parts; Hydrophobic agent in 0.1 to 10 parts; a surface additive in 0.1 to 8 parts; and a solvent 75 to 94 parts. Formulation A is a two pack coating system that is a low cost formulation, having excellent flexibility and adhesion value on the substrates like ABS plastic and aluminum. It has been observed that Formulation A has shown good durability against wet abrasion test.

Embodiments of the invention provide a process for the preparation of the superhydrophobic coating composition which includes the steps of:
preparing the base resin solution by dissolving the polyol resin in the 80% solvent under stirring (about 800 rpm, about 5 min)
adding a surface additive to the resin solution under stirring (about 800 rpm, about 5 minutes)
adding hydrophobic nano-particles and remaining 20% solvent in the same solution under ultra sonication (amplitude about 20%, time: about 4 minutes) and
adding hardener (in 1:1 weight ratio of hardener to base) to the base solution and mix well for about 2 minutes The solution thus prepared may be applied on a substrate by a spray application method. The coating film is cured due to chemical cross linking, and is adsorbed firmly on the surface of the substrate to perform, as per the desired set properties of: generating higher contact angle and water repellency. This is called a chemisorptions route because it is based on the fact that coating film gets cured due to chemical cross linking and gets adsorbed firmly on the surface of the substrate to perform as per the desired set properties of generating higher contact angle and water repellency. The total system is also termed as 2 packs system of 2K (polyester polyol-polyurethane) coating.

In another embodiment of the present invention, the coating composition may be prepared through reactive chemistry, and the resulting coating composition exhibiting excellent results in terms of contact angle, and water rolling effect, sliding angle, transparency, and durability for wet abrasion. Accordingly, the super hydrophobic coating composition includes siloxane and various silanes as solvent, and a hydrophobic agent to generate the lotus leaf effect. The coating composition as per this embodiment yielded a contact angle of about 160° at 5 µL, and a sliding angle of about 2° at 14 µL water droplet. As per this embodiment the coating composition of this invention provides a formulation comprising a hydrophobic agent, an etching chemical and a solvent.

In a specific embodiment, silane may be used as the hydrophobic agent. The silane gets adsorbed on the recesses and projections formed on the surface by the action of the etching chemical, and turn the surface to a super hydrophobic surface.

The term "silane" as used herein is defined as saturated compounds that consist only of hydrogen and silicon atoms and are bonded exclusively by single bonds. Each silicon atom has 4 bonds (either Si—H or Si—Si bonds), and each hydrogen atom is joined to a silicon atom (H—Si bonds). A series of linked silicon atoms is known as the silicon skeleton or silicon backbone. The number of silicon atoms is used to define the size of the silane (e.g., $Si_2$-silane). A silyl group is a functional group or side-chain that, like a silane, consists solely of single-bonded silicon and hydrogen atoms, for example a silyl (—$SiH_3$) or disilanyl group. The simplest possible silane (the parent molecule) is silane, $SiH_4$.

Silanes used herein may be organofunctional silanes of formula Y—R—Si—$(R^1)m(-OR^2)_{3m}$ (2), where Y is a hydroxyl group or a primary or secondary amino group and $R^1$ and $R^2$ are the same or different, monovalent, optionally substituted hydrocarbon groups which comprise between 1 and 12 carbon atoms and can be interrupted with heteroatoms. Silanes operative herein illustratively include an aromatic silane or an alkyl silane. The alkyl silane may comprise linear alkyl silane such as methyl silane, fluoroinated alkyl silane, dialkyl silanes, branched and cyclic alkyl silanes etc.

Typically, the hydrophobic agent is added in an amount of 0.05 to 20 parts by weight, in other embodiments in an amount of from about 0.01 to 10 parts by weight and in other embodiments in an amount of about 0.5 to 4 parts by weight.

Etching chemical is used as surface etching agent, and is one of the prime components in this particular embodiment of the invention, which deals with the surface by reacting the surface with the hydrophilic group on the substrate surface, and is absorbed on the surface. In an embodiment, the etching chemicals may be selected from compounds like sulfuric acid, phosphoric acid, chloro silane, etc. A super hydrophobic coating composition includes the silane containing an etching chemical, and may include one or more etching chemicals selected from the group consisting of chloro silane, dichlorosilane, tetrachlorosilane and trichloromonomethylsilane. The etching chemical may be added in an amount of 0.05 to 10 parts by weight, in other embodiments in an amount of about 0.05 to 6 parts by weight, and in other embodiments in an amount of about 0.05 to 3 parts by weight.

The solvents as per an embodiment may be selected from silicone oil group, which may range from 2 to 10 centi stokes, and preferably acyclic and/or cyclic dimethyl silicone oil. The solvent acts as a carrier for the system. In certain embodiments the solvent is added in an amount of 70 to 99.8 parts by weight, in other embodiments in an amount of from about 80 to 95 parts by weight, and in other embodiments in an amount of about 85 to 95 parts by weight. The coating composition as per this embodiment is given below:

A preferred hydrophobic coating composition as per this embodiment is given below for a Formulation B:

Formulation B:

| Etching Chemicals | 0.05 to 10 parts |
| Hydrophobic agent | 0.05 to 20 parts |
| Solvent | 70 to 99.8 parts |

Embodiments provide a process for the preparation of a super hydrophobic coating composition which comprises the step of blending a solvent with an etching chemical for about 1 minute and then adding the hydrophobic agent, and blending it for about another 5 minutes.

Following process steps and parameters are involved in making

Formulation B:

Taking solvent in a kettle and start stirring (about 300 rpm)

Adding etching chemical to the kettle under moisture free condition and continue to stir for about 1 minute (kettle is purged with nitrogen to make it moisture free)

Adding hydrophobic agent to the kettle and continue to stir for about another 3 minute Formulation B then proceeds to packing under moisture free condition. According to one aspect of the invention, the process of etching of glass may be followed by reacting fluorosilanes with the glass surfaces Formulation B was coated on various substrates like aluminium, glass, ABS plastic and painted surfaces of the automobile parts. All the coating applications were done at room temperature. The coated surface may be rinsed thoroughly with alcohol in order to wash out the excess hydrophobic agent, which helps to reduce the drying time. In an embodiments, 100% ethanol or 100% methanol could be used, or a 80% ethanol and 20% methanol mixture may be used as an alternative for the absolute methanol and ethanol.

The processes as mentioned above may further include the steps of adding other additives conventional to the coating compositions, and the steps of adding other minor or optional components which are not explicitly stated herewith.

A durability test was performed with single wiper blade as per modified ASTM D2486. It was observed that formulation A and B were better than market available samples. It was also observed that the performance during durability test for 2 wiper blades and 3 wiper blades was better than the market sample. The results observed are as follows:

The super hydrophobic coating is stable over wide temperature ranging from −30 to +70° C.

The "lotus leaf effect" is generated in formulation B and contact angle established is 160 degrees along with sliding angle of 2° with over 99% transparency. From the comparative performance details cited in FIG. 1 formulation B is observed to be excellent in terms of performance.

Since formulation B is based on a reactive chemistry recipe, the durability factor is observed to be very high and lasts over 14,000 wipe cycles in wet abrasion testing as compared to market sample.

Formulation B is user friendly and can be easily applicable by spray method. The coating as well as formulation B are observed to be stable from −30° to 70° C. Curing time of the film ranged from 15 minutes to 1 hour duration.

Figure 2A:
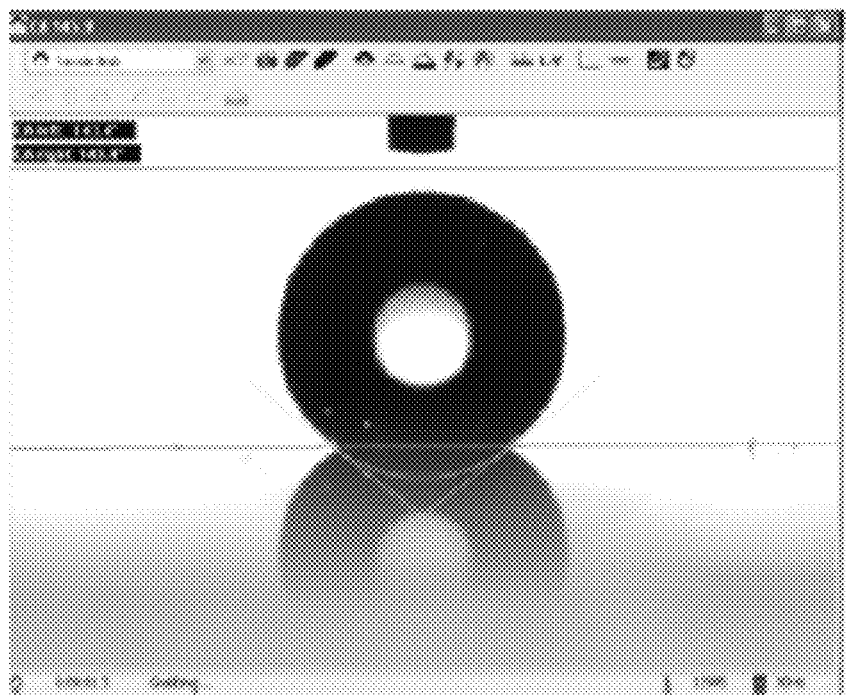
FIG. 2A shows the contact angles for a 5 μL water droplet on coated films for formulation A and B.
Figure 2B:
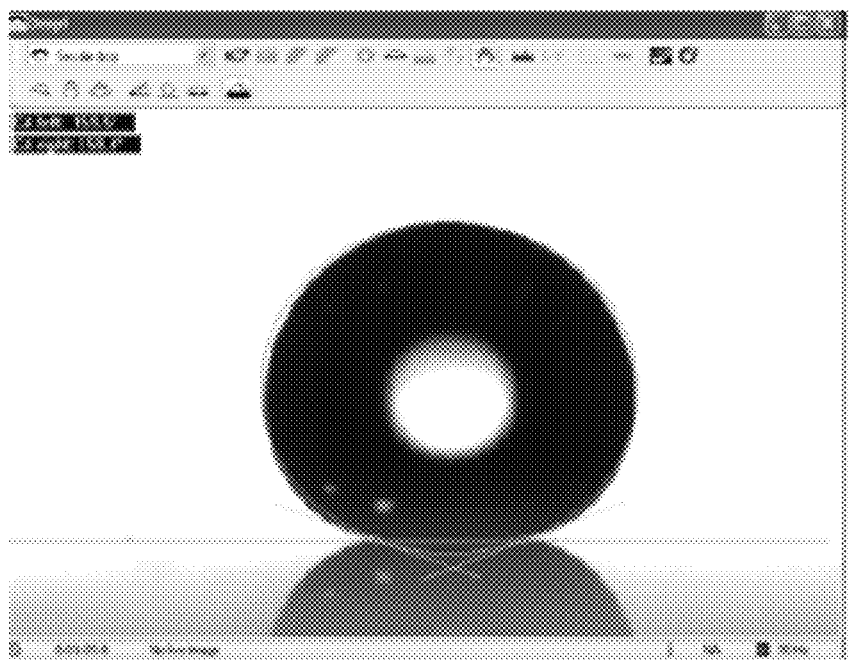
FIG. 2B shows the contact angles for a 5 μL water droplet on coated films for formulation B.

FIG. 2A shows the contact angles of the 5 μL water droplet on coated films for formulation A (CA 143.4°) and FIG. 2B for formulation B (CA 160°).

FIGS. 3 to 5 show how the transparent coating causes water to bead up into drops and roll or bounce off a surface of glass, aluminium, ABS, plastic, and painted panel.

The coatings are 99% transparent (as per the UV spectrometer test) by formation via reactive chemistry, and 73% by adsorption chemistry.

Table 1 provides the test results for comparisons between formulation A and B with Aquapel (market sample) and are also shown in FIG. 1.

TABLE 1

| Properties | Aquapel (Market sample) | Formulation A | Formulation B |
|---|---|---|---|
| Initial Contact Angle | 114.5° | 143.4° | 160° |
| Sliding Angle | 12° | ~15° | 2° |
| Durability: 14000 Cycles | 85° | 87.2° | 102° |
| Transparency: UV spectrometer | 99% | 73% | 99% |
| Reactivity against Seal & Body paint | Non reactive | Non reactive | Non reactive |
| Application on | Wind shield glass | Aluminium, ABS plastic | Wind shield glass, Aluminium, ABS plastic |

Among the advantages exhibited by embodiments of the inventive formulations versus market samples include:
a) Super hydrophobic coating of the present invention is user friendly and can be applied with simple surface cleaning prior to application, no tedious surface preparation like plasma or corona treatment is needed,
b) The coating may be applied by simple spray at any ambient temperature, and does not require forced drying.
c) Since the product recipe is reactively coupled to the glass, plastic and metal surfaces, the durability is enhanced even under wet abrasion conditions.
d) The present coating is about 99% transparent as per UV Spectrometer
e) Durability in terms of contact angle and water rolling effect is found to be excellent even after continuous exposure to running water for 5 hours, and after subjecting the coating to the wet abrasion test.
f) This super hydrophobic recipe is capable to introduce the lotus leaf effect over a variety of substrates including plastic and metal thus providing a huge application base where water contact is an issue.

Any patents or publications mentioned in this specification are herein incorporated by reference to the same extent as if each individual publication was specifically and individually indicated to be incorporated by reference.

The foregoing description is illustrative of particular embodiments of the invention, but is not meant to be a limitation upon the practice thereof. The following claims, including all equivalents thereof, are intended to define the scope of the invention.

The invention claimed is:
1. A super hydrophobic coating composition comprising:
a hydrophobic agent;
a binder or an etching chemical; and
a surface additive comprising silicone modified polyacrylate.
2. The super hydrophobic coating composition as claimed in claim 1 wherein it further comprises a solvent.
3. The super hydrophobic coating composition as claimed in claim 2 wherein the solvent comprises xylene, butyl acetate, toluene or ethyl acetate.
4. The super hydrophobic coating composition as claimed in claim 2 wherein the hydrophobic agent, the solvent and the etching chemical are present.
5. The super hydrophobic coating composition as claimed in claim 4 wherein the hydrophobic agent comprises a silane.
6. The super hydrophobic coating composition as claimed in claim 5 wherein the silane comprises an alkyl silane.
7. The super hydrophobic coating composition as claimed in claim 6 wherein the alkyl silane comprises methyl silane, linear dialkyl silane, fluorinated alkyl silane or cyclic alkyl silane.
8. The super hydrophobic coating composition as claimed in claim 4 wherein the solvent comprises silicone oil.
9. The super hydrophobic coating composition as claimed in claim 8 wherein the silicone oil comprises acyclic and/or cyclic dimethyl silicone oil.
10. The super hydrophobic coating composition as claimed in claim 9 wherein the acyclic and/or cyclic dimethyl silicone oil is one of hexamethyldisiloxane, octamethyltrisiloxane, decamethylcyclopentasiloxane or octamethylcyclotetrasiloxane.
11. The super hydrophobic coating composition as claimed in claim 8 wherein the silicone oil ranges from 2 to 10 centistokes.
12. The super hydrophobic coating composition as claimed in claim 4 wherein the hydrophobic agent is present in an amount of 0.05 to 20 parts by weight, the etching chemical is present in an amount of 0.05 to 10 parts by weight and the solvent is present in an amount of 70 to 99.8 parts by weight.
13. The super hydrophobic coating composition as claimed in claim 1 wherein the hydrophobic agent comprises organically modified nano particles of silica or titanium.
14. The super hydrophobic coating composition as claimed in claim 1 wherein the binder comprises polyurethane comprised of a polyol and an isocyanate.
15. The super hydrophobic coating composition as claimed in claim 1 further comprising organically modified nanoparticles of silica or titanium as the hydrophobic agent and polyurethane as the binder.
16. The super hydrophobic coating composition as claimed in claim 1 wherein the hydrophobic agent is present in an amount of 0.1 to 10 parts by weight, the binder is present in an amount of 0.1 to 10 parts by weight, and further comprising a solvent present in an amount of 75 to 94 parts by weight and a surface additive present in an amount of 0.1 to 8 parts by weight.
17. The super hydrophobic coating composition as claimed in claim 1 wherein the etching chemical comprises sulphuric acid, phosphoric acid or chlorosilane.
18. A super hydrophobic coating produced from a composition comprising:
a hydrophobic agent of silane of a saturated compound consisting of hydrogen and silicon atoms that are bonded exclusively by single bonds, the hydrophobic agent being present from 0.05 to 20 parts by weight;
an etching chemical present from 0.05 to 10 parts by weight and being at least one of chlorosilane, dichlorosilane, tetrachlorosilane and trichloromonomethylsilane; and a solvent present from 70 to 99.8 parts by weight;

the hydrophobic agent and the etching chemical upon evaporation of the solvent forming the coating and having a contact angle of greater than 150°.

19. The coating as claimed in claim 18 wherein the contact angle is greater than 160°.

20. The coating as claimed in claim 18 wherein coating has a transparency of at least 99%.

21. The coating as claimed in claim 18 wherein coating has a slide angle of less than 10°.

22. A super hydrophobic coating produced from a composition comprising:

a hydrophobic agent of organically modified nanoparticles of silica or titanium, the hydrophobic agent being present from 0.1 to 10 parts by weight;

binder present from 0.1 to 10 parts by weight;

a surface additive present from 0.1 to 8 parts by weight, wherein the surface additive comprising silicone modified polyacrylate; and a solvent present from 75 to 94 parts by weight, the hydrophobic agent upon polymerization of the binder and evaporation of the solvent forming the super hydrophobic coating having a contact angle of greater than 150°.

23. The coating as claimed in claim 22 wherein coating has a transparency of at least 73%.

24. The coating as claimed in claim 22 wherein coating as a slide angle of less than 10°.

* * * * *